United States Patent
Shao et al.

(10) Patent No.: US 8,179,871 B2
(45) Date of Patent: *May 15, 2012

(54) METHOD AND SYSTEM FOR CHANNEL ACCESS CONTROL FOR TRANSMISSION OF VIDEO INFORMATION OVER WIRELESS CHANNELS

(75) Inventors: Huai-Rong Shao, San Jose, CA (US); Harkirat Singh, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1278 days.

This patent is subject to a terminal disclaimer.

(21) Appl. No.: 11/726,779

(22) Filed: Mar. 22, 2007

(65) Prior Publication Data

US 2007/0230338 A1    Oct. 4, 2007

Related U.S. Application Data

(60) Provisional application No. 60/787,345, filed on Mar. 29, 2006.

(51) Int. Cl.
*H04W 4/00* (2009.01)
(52) U.S. Cl. ......... 370/338; 370/311; 370/330; 370/331
(58) Field of Classification Search .................. 370/338, 370/331, 330, 311
See application file for complete search history.

(56) References Cited

U.S. PATENT DOCUMENTS

| | | | |
|---|---|---|---|
| 5,999,127 A | 12/1999 | Dezelan | |
| 6,526,036 B1 | 2/2003 | Uchida et al. | |
| 6,865,609 B1* | 3/2005 | Gubbi et al. | 709/230 |
| 7,221,680 B2 | 5/2007 | Vijayan et al. | |
| 7,359,351 B2 | 4/2008 | Cho et al. | |
| 7,379,443 B2 | 5/2008 | Ahuja et al. | |
| 7,450,610 B2 | 11/2008 | An | |
| 7,489,682 B2 | 2/2009 | Kubota | |
| 7,499,462 B2 | 3/2009 | MacMullan et al. | |
| 7,564,862 B2 | 7/2009 | Srikrishna et al. | |
| 7,570,627 B2 | 8/2009 | Welborn et al. | |
| 7,653,024 B2 | 1/2010 | Dekorsy et al. | |
| 7,653,030 B2 | 1/2010 | Arrakoski et al. | |

(Continued)

FOREIGN PATENT DOCUMENTS

EP    1478135 A1    11/2004

(Continued)

OTHER PUBLICATIONS

Chinese Notice of Allowance dated Feb. 25, 2011 for Chinese Patent Application 200780008339.4 from the China Intellectual Property Office, pp. 1-2, China Intellectual Property Office, People's Republic of China (English Translation attached, pp. 1-2).

(Continued)

*Primary Examiner* — Charles Shedrick
(74) *Attorney, Agent, or Firm* — Kenneth L. Sherman, Esq.; Michael Zarrabian, Esq.; Sherman & Zarrabian LLP

(57) ABSTRACT

A method and system for channel access control for transmission of uncompressed video information over wireless channels. A contention-free period (CFP) for high-rate and low-rate channels is divided into schedules in which one or multiple periodical channel time blocks are reserved for wireless transmission of isochronous streams.

56 Claims, 15 Drawing Sheets

U.S. PATENT DOCUMENTS

| | | | |
|---|---|---|---|
| 7,903,614 B2 | 3/2011 | Pietraski | |
| 2001/0017851 A1* | 8/2001 | Yamaguchi et al. | 370/332 |
| 2004/0029591 A1* | 2/2004 | Chapman et al. | 455/452.1 |
| 2004/0139477 A1 | 7/2004 | Russell et al. | |
| 2004/0190467 A1* | 9/2004 | Liu et al. | 370/311 |
| 2005/0053015 A1 | 3/2005 | Jin et al. | |
| 2005/0141451 A1 | 6/2005 | Yoon et al. | |
| 2005/0152394 A1 | 7/2005 | Cho | |
| 2006/0009229 A1* | 1/2006 | Yuan et al. | 455/452.1 |
| 2006/0056316 A1* | 3/2006 | Chandra et al. | 370/254 |
| 2006/0164969 A1 | 7/2006 | Malik et al. | |
| 2006/0209892 A1 | 9/2006 | MacMullan et al. | |
| 2007/0230338 A1* | 10/2007 | Shao et al. | 370/230 |
| 2007/0253391 A1* | 11/2007 | Shao et al. | 370/338 |
| 2007/0268868 A1* | 11/2007 | Singh et al. | 370/331 |
| 2008/0198875 A1* | 8/2008 | Qin et al. | 370/468 |
| 2009/0080366 A1 | 3/2009 | Shao et al. | |
| 2009/0232103 A1* | 9/2009 | Kesselman et al. | 370/336 |
| 2009/0310574 A1* | 12/2009 | Jeon et al. | 370/336 |
| 2010/0226343 A1* | 9/2010 | Hsu et al. | 370/336 |

FOREIGN PATENT DOCUMENTS

| | | |
|---|---|---|
| EP | 1494867 A2 | 12/2004 |
| WO | WO 2007111474 A1 * | 10/2007 |

OTHER PUBLICATIONS

Chinese Office Action dated Aug. 30, 2010 for Chinese Patent Application 200780008339.4 from the China Intellectual Property Office, pp. 1-3, China Intellectual Property Office, People's Republic of China (A machine-generated English Translation attached, pp. 1-6).

U.S. Non-final Office Action for U.S. Appl. No. 11/903,783, mailed Nov. 24, 2010.

U.S. Non-final Office Action for U.S. Appl. No. 11/903,783, mailed May 12, 2011.

U.S. Final Office Action for U.S. Appl. No. 11/903,783, mailed Oct. 25, 2011.

Hitachi, Ltd. et al., High-Definition Multimedia Interface (HDMI) Specification Version 1.2, Aug. 22, 2005, pp. 1-214.

802.15.3™ IEEE Standard for information Technology-Telecommunications and information exchange between systems-Local and metropolitan area networks-Specific requirements, Part 15.3: Wireless Medium Access Control (MAC) and Physical Layer (PHY) Specifications for High Rate Wireless Personal Area Networks (WPANs), IEEE Std 802.15.3-2003. IEEE Computer Society, Sep. 29, 2003, 324 pages.

Van Veen, B.; and Buckley, K., "Beamforming: A Versatile Approach to Spatial Filtering," IEEE ASSP Magazine, vol. 5, pp. Apr. 4-24, 1988.

Patent Cooperation Treaty; International Search Report and Written Opinion for PCT/KR2007/001509. Jun. 27, 2007.

IEEE P802.11e/D13.0, Part 11: Wireless LAN Medium Access Control (MAC) and Physical Layer (PHY) Specifications: "Amendment: Medium Access Control (MAC) Quality of Service (QoS) Enhancements," LAN/MAN Committee of the IEEE Computer Society, Jan. 2005, pp. 1-198 , New York, NY, United States.

IEEE Wireless LAN Edition, "A Compilation Based on IEEE Std 802.11—1999 (R2003) and its Amendments," IEEE Standards Information Network, Sep. 19, 2003, IEEE Press, pp. 1-706, New York, New York, United States.

Stephens, A. et al., "Joint Proposal: High Throughput Extension to the 802.11 Standard: MAC," IEEE 802.11-05/1095r2, IEEE Press, Nov. 16, 2005, pp. 1-37, New York, NY, United States.

Zhu, H. et al., "A Power-Aware and QoS-Aware Service Model on Wireless Networks," INFOCOM 2004, 23rd Annual Joint Conference of the IEEE Computer and Communication Societies, Mar. 2004, vol. 2, pp. 1393-1403, United States.

Notification of Transmittal of the International Search Report and Written Opinion for International Application No. PCT/KR2007/002445 from Korean Intellectual Property Office dated Jan. 17, 2008, 10 pages.

U.S. Non-final Office Action for U.S. Appl. No. 11/787,576, mailed Apr. 29, 2010.

U.S. Final Office Action for U.S. Appl. No. 11/787,576, mailed Sep. 13, 2010, United States.

European Search Report dated Feb. 27, 2012 for European Application No. EP 07746593, pp. 1-7, European Patent Office, Munich, Germany.

Kim, J.E. et al., "An Improvement of Channel Efficiency for IEEE 802.15.3 High Rate WPAN", Proceedings of the 2006 International Conference on Advanced Communication Technology (ICACT), Feb. 20, 2006, pp. 1677-1680, vol. 3, IEEE, United States.

Rangnekar, A. et al., "QoS Aware Multi-Channel Scheduling for IEEE 802.15.3 Networks", Feb. 1, 2006, pp. 47-62, vol. 11, No. 1, Kluwer Academic, United States.

Gilb, J.P.K. et al., "Proposal for Wireless support of uncompressed HD audio and video using 60 GHz unlicensed band", Project: IEEE P802.15 Working Group for Wireless Personal Area Networks (WPANs), Mar. 13, 2007, pp. 1-15, IEEE, United States.

Chinese Office Action dated Dec. 31, 2011, for Chinese Patent Application 200780052615.7 from China Intellectual Property Office, pp. 1-24, China Intellectual Property Office, People's Republic of China (Machine-generated English-language translation attached, pp. 1-10).

\* cited by examiner

High-rate channel
Low-rate channel

10

| Octets: 2 | 1 | 2 | 1 | 1 | 1 | 1 |
|---|---|---|---|---|---|---|
| Minimal Time Distance | Number of Time Blocks | Duration of Time Block | Stream Index | Stream Request ID | Channel ID | DestID |
| 50G | 50F | 50E | 50D | 50C | 50B | 50A |

METHOD AND SYSTEM FOR CHANNEL ACCESS CONTROL FOR TRANSMISSION OF VIDEO INFORMATION OVER WIRELESS CHANNELS

RELATED APPLICATION

This application claims priority from U.S. Provisional Patent Application Ser. No. 60/787,345, filed on Mar. 29, 2006, incorporated herein by reference.

FIELD OF THE INVENTION

The present invention relates to wireless transmission of video information, and in particular, to channel access control for transmission of video information.

BACKGROUND OF THE INVENTION

With the proliferation of high quality video, an increasing number of electronics devices (e.g., consumer electronics devices) utilize high definition (HD) video which can require more multiple gigabit per second (Gbps) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency (RF)) technology that is capable of transmitting uncompressed HD video signals. Wireless local area network (WLAN) and similar technologies can suffer interference issues when several devices are connected which do not have the bandwidth to carry the uncompressed HD signal, and do not provide an air interface to transmit uncompressed video over 60 GHz band.

The IEEE 802.15.3 specifies channel access methods for transmission of audio/visual information over WLANs. However, in the IEEE 802.15.3, channel access control is complicated and is only for access to a single channel. In addition, in the IEEE 802.15.3, channel time allocation description carried in a beacon is quite large because every allocated time block is described independently. As such, there is a need for a method and system that address the above shortcomings for channel access control in wireless transmission of video information.

BRIEF SUMMARY OF THE INVENTION

The present invention provides a method and system for channel access control for transmission of video information, such as uncompressed video over wireless channels. In one embodiment, communication of video information over wireless channels in a network of senders and receivers includes packetizing video information of one or more video streams into packets for transmission over a wireless channel; controlling channel access by dividing a contention-free period (CFP) into one or more schedules, wherein each schedule includes one or more periodical channel time blocks (CTBs) reserved for transmission of isochronous streams; and transmitting packets from a sender to a receiver during the channel time blocks.

A contention-free period (CFP) for high-rate and low-rate channels is divided into schedules in which one or multiple periodical channel time blocks are reserved for wireless transmission of isochronous streams. Specifically, controlling channel access further includes dividing the CFP into channel time blocks into schedules for a high-rate channel and a low-rate channel and transmitting packets further includes transmitting packets of video information from a sender to a receiver over a high-rate channel during the channel time blocks, and transmitting acknowledgment packets from the receiver to sender over a low-rate channel during the channel time blocks.

These and other features, aspects and advantages of the present invention will become understood with reference to the following description, appended claims and accompanying figures.

BRIEF DESCRIPTION OF THE DRAWINGS

FIG. 10 shows an example format of a bandwidth request item in FIG. 9, according to the present invention.

DETAILED DESCRIPTION OF THE INVENTION

The present invention provides a method and system for channel access control for transmission of uncompressed video information over wireless channels. According to an embodiment of the present invention, a CFP for high-rate and low-rate channels is divided into schedules in which one or multiple periodical channel time blocks are reserved for wireless transmission of isochronous streams.

In many wireless communication systems, a frame structure is used for data transmission between a transmitter and a receiver. For example, the IEEE 802.11 standard uses frame aggregation in a Media Access Control (MAC) layer and a physical (PHY) layer. In a typical transmitter, a MAC layer receives a MAC Service Data Unit (MSDU) and attaches a MAC header thereto, in order to construct a MAC Protocol Data Unit (MPDU). The MAC header includes information such a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

Figure 1:
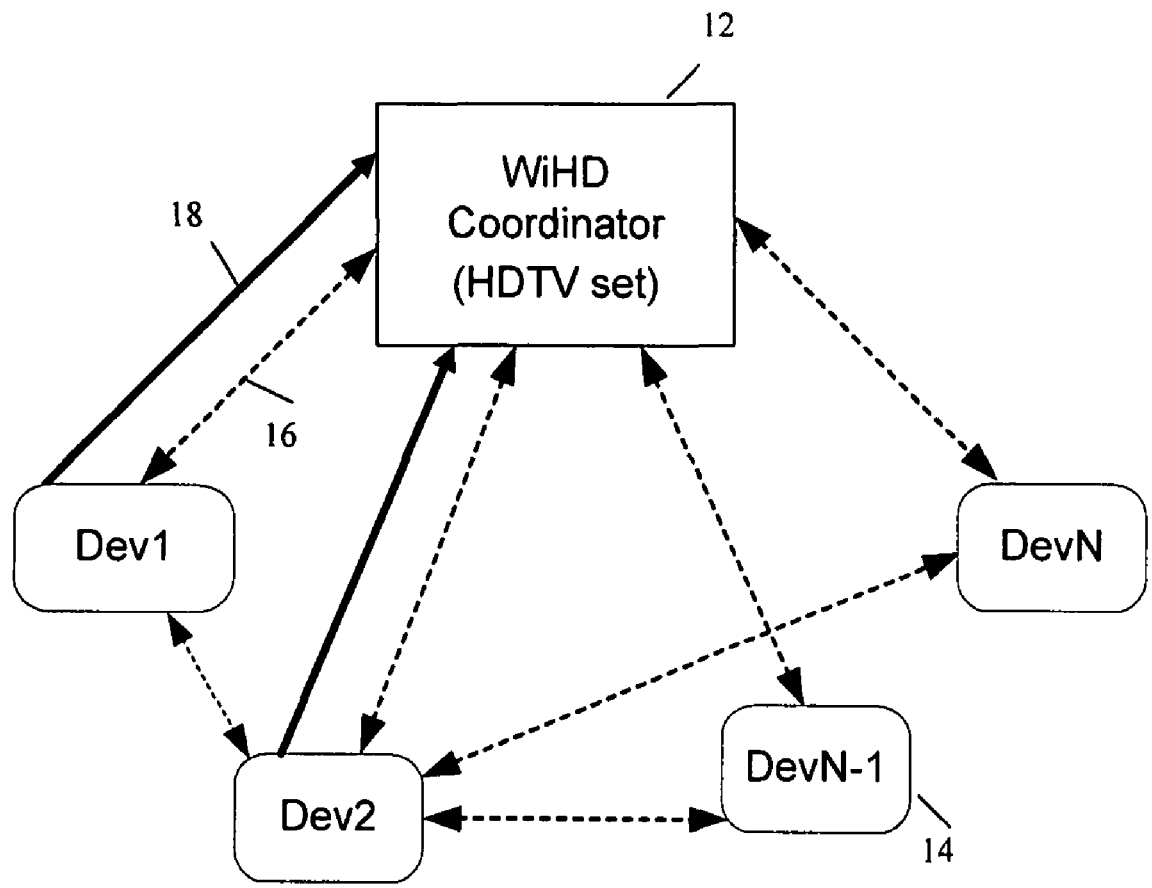
FIG. 1 shows a functional block diagram of a wireless network that implements uncompressed HD video transmission between wireless stations, according to an embodiment of the present invention.

FIG. 1 shows a functional block diagram of a wireless network 10 that implements uncompressed HD video transmission between wireless stations, according to an embodiment of the present invention. The network 10 includes a coordinator 12 such as a wireless HD (WiHD) coordinator, and multiple wireless stations 14 (e.g., Dev1, . . . , DevN). The coordinator 12 and the stations 14 utilize a low-rate channel 16 (dashed lines in FIG. 1) and a high-rate channel 18 (heavy solid lines in FIG. 1) for communication therebetween.

In this example, the coordinator 12 is a sink of video and/or audio data implemented, for example, in a HDTV set in a home wireless network environment which is a type of WLAN. In another example, the coordinator 12 can be a source of a video stream. In yet another example, the coordinator provides channel coordination functions for wireless communication between a sink station and a source station. The coordinator function for channel access according to the present invention can be implemented in a stand-alone device, or in a sink device, or in a source device.

Each station 14 comprises a device that can be a source of uncompressed video or audio. Examples of each station 14 can be a set-top box, a DVD player, etc. A station 14 can also be audio such as an audio sink.

In this example, the coordinator 12 uses a low-rate channel 16 and a high-rate channel 18, for communication with the stations 14. Each station 14 uses the low-rate channel 16 for control communications with the other stations 14. The high-rate channel 18 only supports single direction unicast transmission with, e.g., multi-Gb/s bandwidth to support uncompressed HD video transmission. The low-rate channel 16 can support bi-directional transmission, e.g., with at most 40 Mbps (megabits per second) throughput. The low-rate channel 16 is primarily used to transmit control frames such as acknowledgement (ACK) frames. A station 14 can use the high-rate channel 18 to transmit video information to another station 14, wherein channel access is controlled by the coordinator.

Figure 2:
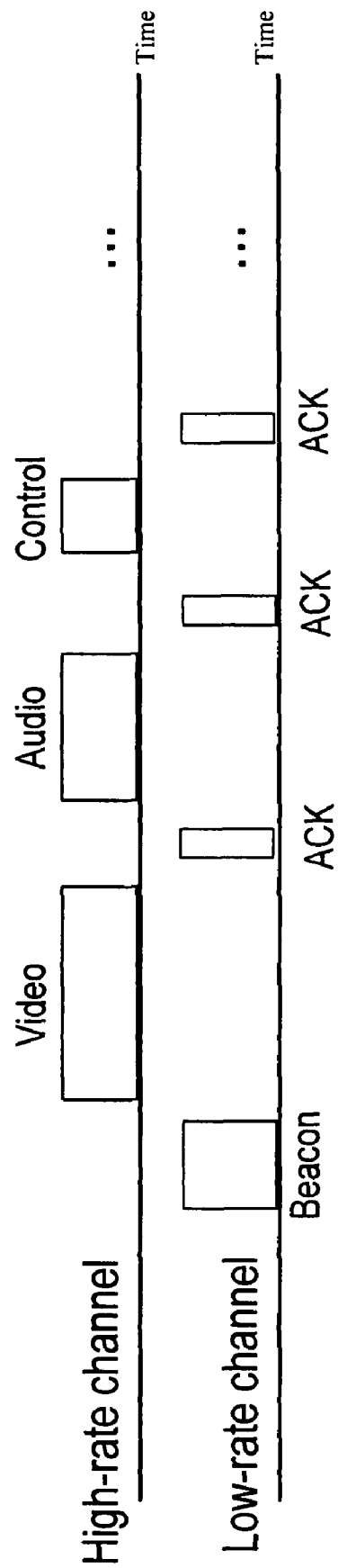
FIG. 2 shows an example timing diagram for Time Division Duplex (TDD) scheduling applied to low-rate and high-rate wireless communication channels in FIG. 1.

FIG. 2 shows an example application of TDD scheduling to the low-rate and high-rate channels 16 and 18, whereby, at any one time the low-rate and high-rate channels 16 and 18 cannot be used in parallel for transmission. In the example of FIG. 2, Beacon and ACK frames are transmitted over the low-rate channel 16 in between transmission of data packets of (e.g., video, audio and control message) information over the high-rate channel 18.

There are two approaches for a wireless station (STA) to access a shared wireless communication channel. One approach is a contention-free arbitration (CF) method, and the other is a contention-based arbitration (CB) method. The CF access method utilizes a point coordinator function (PCF) to control access to the channel. When a PCF is established, the PCF polls the registered STAs for communications and provides channel access to the STAs based upon the polling results. The CB access method utilizes a random back-off period to provide fairness in accessing the channel. In a CB period, a STA monitors a channel, and if the channel has been silent for a pre-defined period of time, the STA waits for a certain period of time, such that if the channel remains silent, the STA transmits on the channel.

Figure 3A:
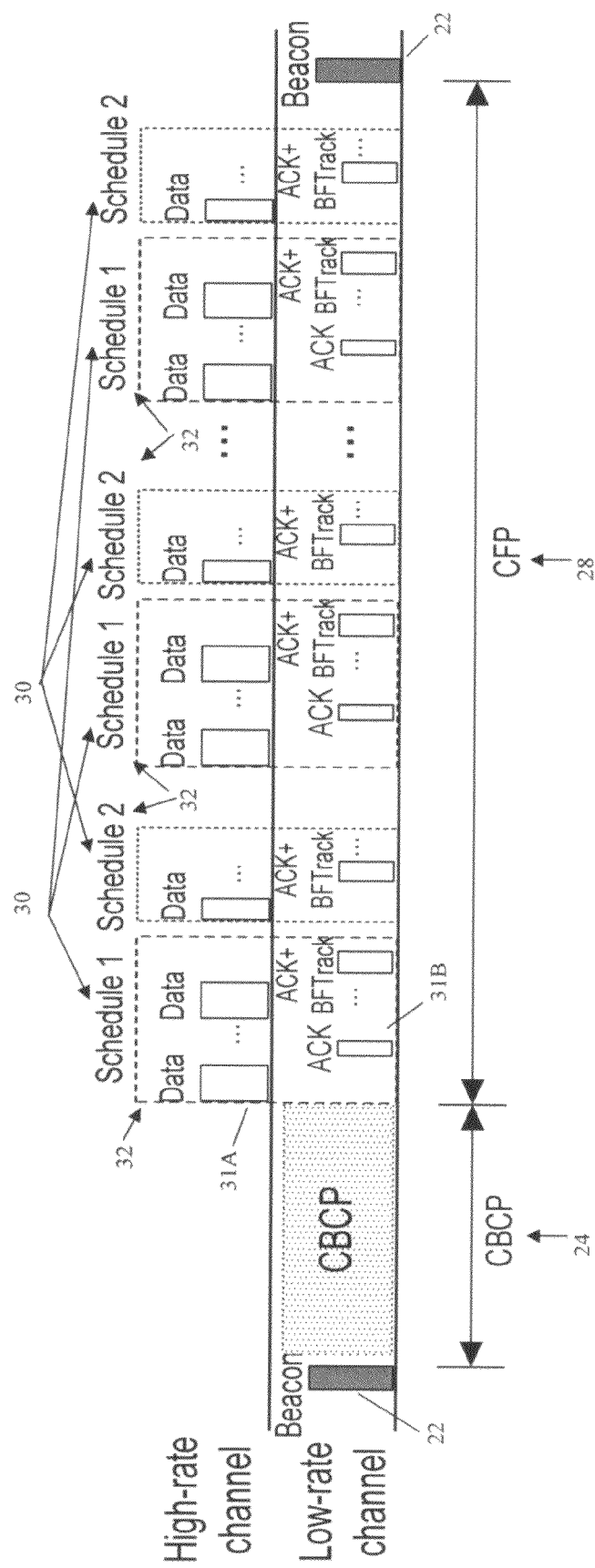
FIG. 3A shows an example superframe structure for dividing a CFP for shared channel access into multiple schedule periods for transmission of video information in the network of FIG. 1, according to the present invention.
Figure 3B:
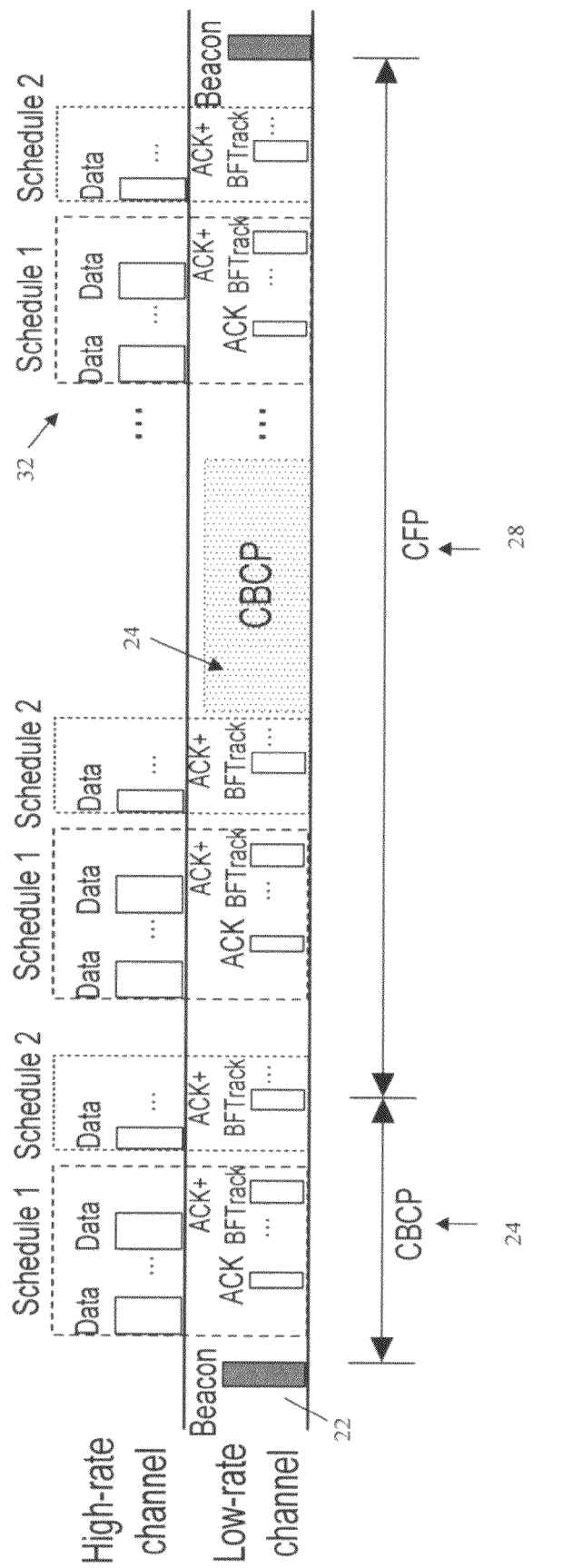
FIG. 3B shows an example superframe structure including a beam-search period, according to the present invention.
Figure 4:
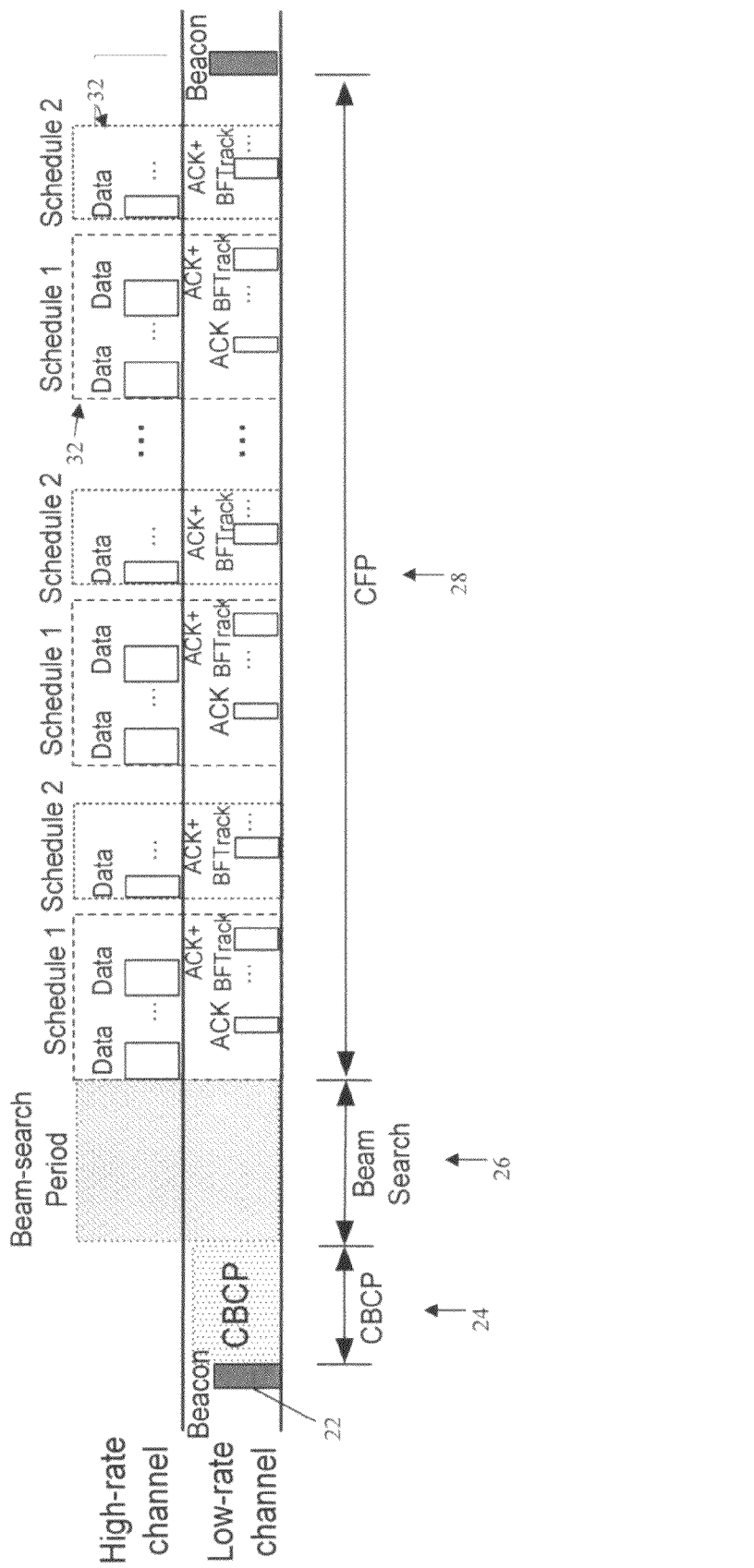
FIG. 4 shows an example superframe structure, without a beam-search period, according to the present invention.

Referring to examples in FIGS. 3A-B and 4, the present invention provides a superframe 20 for dividing a CFP for high-rate and low-rate channels into multiple schedules (periods). Each schedule includes one or more periodical channel time blocks (CTBs) 32 which are reserved for transmission of isochronous data streams. Such a superframe 20 is useful for channel access control for transmission of uncompressed video over wireless channels (e.g., the high-rate channel 18 and the low-rate channel 16), and comprises four primary parts:

1. A Beacon frame ("Beacon") 22 which is used to set timing allocations and to communicate management information for the network 10 (e.g., WiHD sub-net).
2. A contention-based control period (CBCP) 24 which is used to communicate control and management commands on the low-rate channel 16, if it is present in the superframe 20. No information can be transmitted on the high-rate channel 18 within the CBCP period.
3. A beam-search period (BSP) 26 (FIG. 4) which is used to search transmission beams and adjust beamforming parameters, if it is present in the superframe 20. Typically, every 1~2 seconds a BSP 26 appears in the corresponding superframe 20.
4. A CFP 28 which includes of a series of CTBs 32. The CTBs are reserved by one or multiple stations 14 for transmission of commands, isochronous streams and asynchronous data connections.

A Beacon 22 is transmitted periodically to identify the start of every superframe 20. Configuration of the superframe 20 and other parameters are included in the Beacon 22. For example, the Beacon 22 indicates the start time and length of the periods CBCP 24, BSP 26 and CFP 28. In addition, the Beacon 22 dictates an allocation of the CTBs 32 in the CFP 28 to different stations 14 and streams. The BFTrack information (e.g., FIGS. 3A-B) provide beam tracking information. The beam tracking information is piggybacked with video data information periodically to maintain beamforming transmission quality.

The CBCP 24 generally appears immediately after the Beacon 22, but can essentially appear anywhere in the superframe 20. For example, the CBCP 24 can be immediately after the Beacon 22 and also in the middle of a superframe 20, as illustrated by the example in FIG. 3A. The basic medium access mechanism used during a CBCP 24 can be, e.g., Aloha, slotted Aloha, carrier sense multiple access with collision avoidance (CSMA/CA) or other random access control schemes, as known to those skilled in the art.

A CBCP 24 is primarily used for the transmission of control and management packets between stations 14 and the coordinator 12, and also between stations 14 if direct link support (DLS) is allowed. During the CBCP 24, only the low-rate channel 16 can be used. No information can be transmitted on the high-rate channel 18 within the CBCP 24. The length of the CBCP 24 can be adjusted for every superframe 20 from MinCBCPLen (e.g., larger than the average control packet size in a WiHD network) to MaxCBCPLen (e.g., smaller than half of the superframe size). When a BSP 26 appears in the superframe 20 (FIG. 4), and the existing traffic data rate is approaching the total channel bandwidth capacity, the length of the CBCP 24 in the same superframe 20 is set to MinCBCPLen.

For beam searching and tracking on a channel, typically every 1~2 seconds a BSP 26 appears in the corresponding superframe 20. Further, for every 5~10 packets transmitted on the high-rate channel 18, there will be a beam-track request and response information piggybacked in the corresponding data and acknowledgment packets. A detailed description of the process of beam searching and tracking is out of the scope of this invention.

As shown in FIGS. 3A-B and 4, channel access in the CFP 28 is based on a Time Division Multiple Access (TDMA) method for shared medium access. TDMA allows several nodes to share the same channel frequency by dividing it into different timeslots. The nodes transmit in rapid succession, one after the other, each using its own timeslot. This allows multiple nodes to share the same channel while using only the part of the channel bandwidth they require.

In one example, a station 14 sends a bandwidth request command to the coordinator 12 for the transmission of both isochronous streams and asynchronous data over a channel. If there is enough bandwidth in that channel, the coordinator 12 allocates a time period (i.e., schedule 30 (e.g., Schedule1, Schedule2, etc.)) in the CFP 28 for the requesting station 14. Each schedule 30 comprises a series of evenly distributed CTBs 32 with equal length in the CFP 28. In an extreme case, a schedule 30 can only have one CTB in a superframe 20. Usually an isochronous stream is transmitted within one schedule 30. However, multiple schedules 30 can be allocated for one isochronous or asynchronous steam. Multiple streams belonging to the same station 14 can also be transmitted within one schedule 30. Within during one CTB 32, a single data-ACK pair (e.g., 31A, 31B in FIG. 3A) or multiple data-ACK pairs can be transmitted.

The allocated schedules 30 can be changed via bandwidth request commands and are announced by the Beacon 22. The allocated schedules 30 can span multiple superframes 20, or be contained within one particular superframe 20.

The CTBs 32 are evenly distributed within a schedule 30 in a superframe 20 because data for an isochronous stream arrives at a transmission buffer of a sender constantly, and evenly distributed CTBs 32 can reduce the jitter caused by wireless transmission in the network 10. Further, this allows reduction of buffer size at both a sender and a receiver in the network 10. In addition, the allocation information for the CFP 28, carried in the Beacon 22, can be reduced since one schedule description can cover multiple CTBs 32 in a superframe 20. This is important for WiHD networks since the Beacon 22 is transmitted over the low-rate channel 16 and the larger the Beacon 22, the larger the overhead in the low-rate channel 16.

Figure 5:
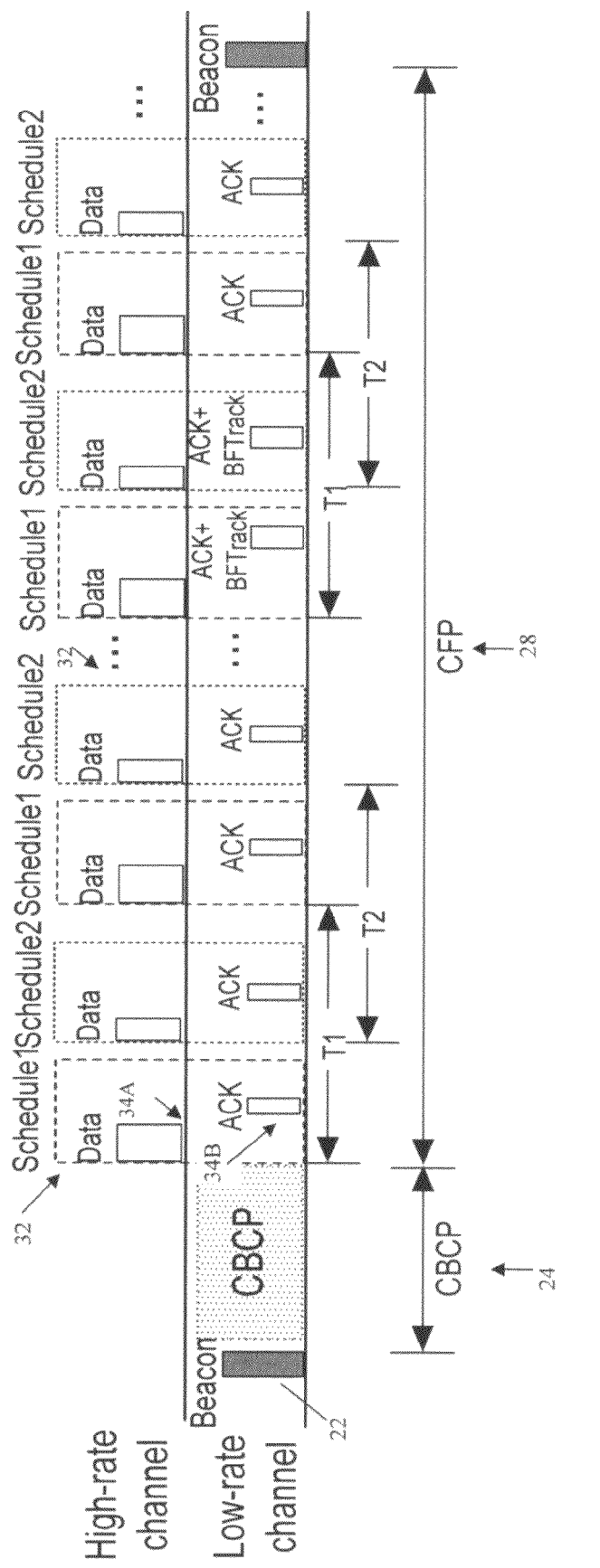
FIG. 5 shows an example superframe structure with CFP time allocation for two streams with one data packet buffer size requirement, according to the present invention.

FIG. 5 shows a superframe 20 with an example CFP 28 time allocation wherein two schedules 30 (i.e., Schedule1 and Schedule2) are allocated. For each schedule 30, only a single data-ACK pair 34A, 34B is allowed within each CTB 32, in order to minimize the buffer size requirement. Therefore, a sender periodically sends packets for the stream to a receiver using Schedule1 or Schedule2. In FIG. 5, T1 indicates the time period between the start of each Schedule1 interval, and T2 indicates the time period between the start of each Schedule2 interval.

Figure 6:
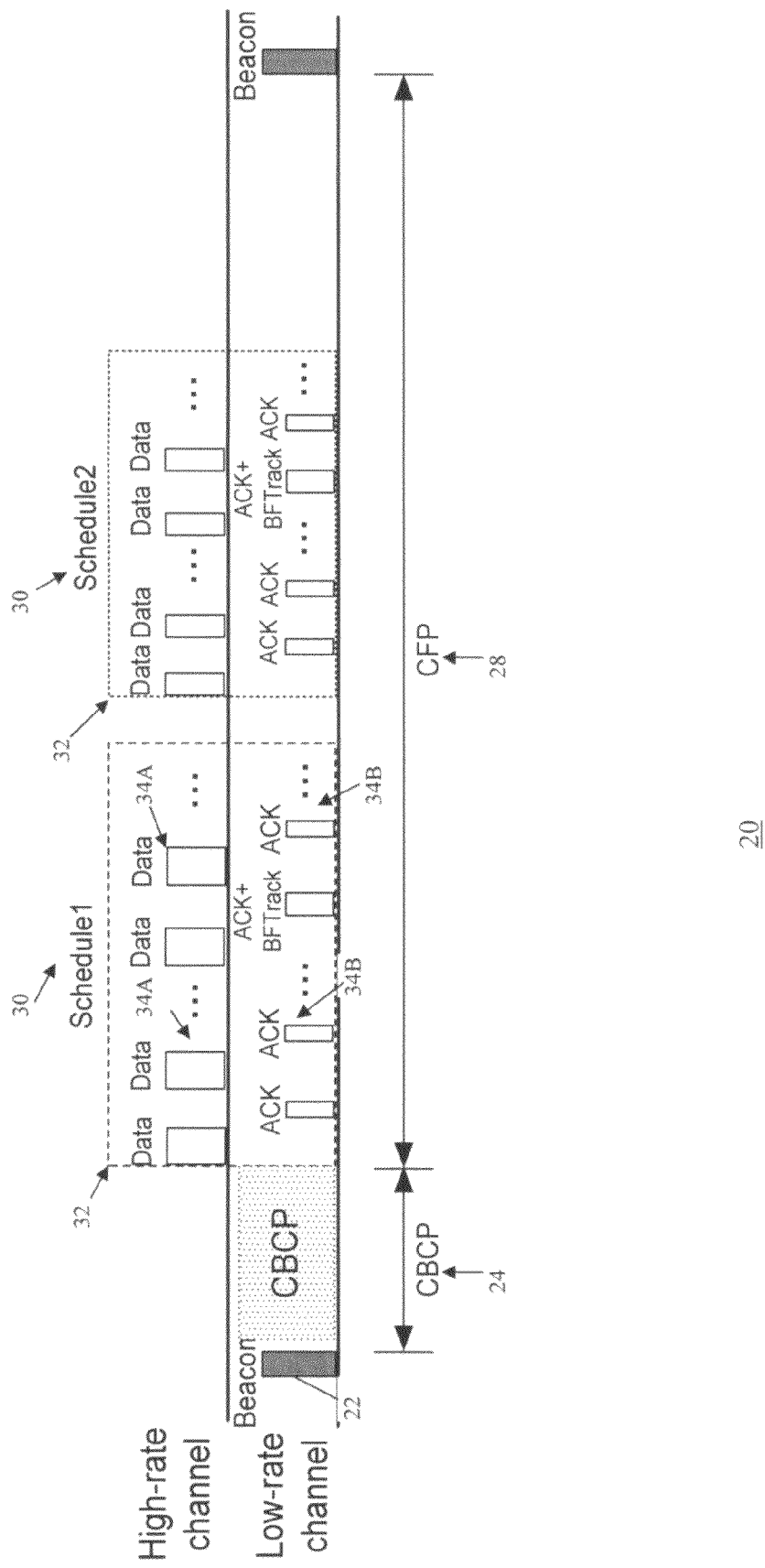
FIG. 6 shows an example superframe structure with CFP time allocation for two streams wherein the sender and receiver have large buffers, according to the present invention.

FIG. 6 shows a superframe 20 with another example CFP 28 time allocation with two schedules 30: Schedule1 and Schedule2. Each schedule only has one CTB 32 in the superframe 20 in order to minimize the switching between the two streams. Using Schedule1 or Schedule2, the sender buffers all packets that should be transmitted in one superframe, and transmits the packets in a burst fashion within one CTB 32.

Figure 7:
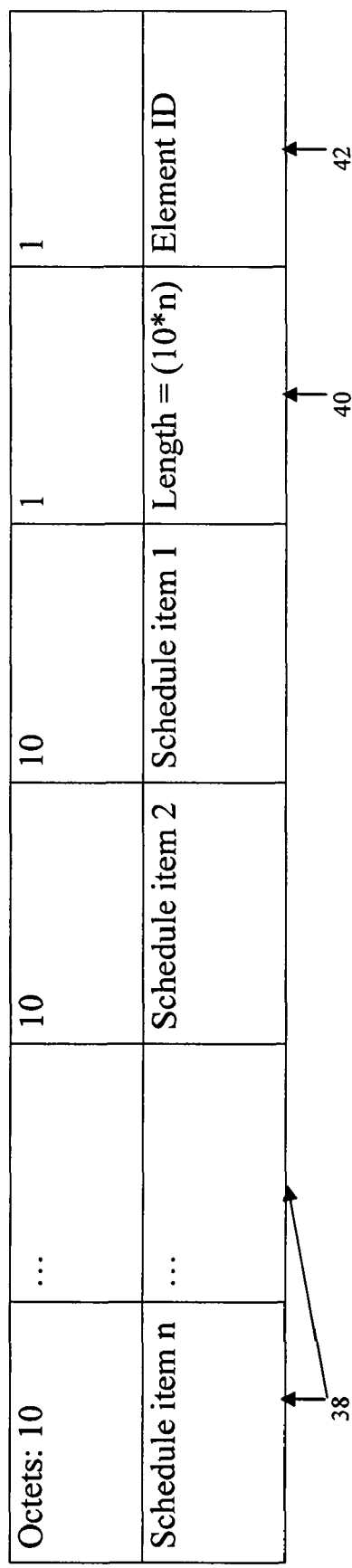
FIG. 7 shows an example CFP schedule information element format in a beacon frame of FIG. 1, according the present invention.

An example format of schedule description and bandwidth request commands is now described. As shown by example in FIG. 7, information for a schedule 30 (CFP schedule) is placed in an information element (IE) 36 in the Beacon 22, wherein each IE 36 includes multiple schedule items 38 (i.e., Schedule item 1, . . . , Schedule item n). Each IE 36 further includes a length 40 and an IE Element ID 42.

All schedules 30 allocated for different streams can be announced in the schedule IEs 36 of every Beacon 22. To reduce beacon size, only when there is some schedule changes (such as adding a new schedule), the corresponding schedule IE 36 is carried in a Beacon 22.

When a new station 14 joins the WiHD network 10, the coordinator 12 forwards all the schedule IE information to the new station 14 at an association response phase. Further, after a station 14 goes to sleep for a long period which spans multiple superframes 20, that station 14 wakes up and requests a schedule IE from the coordinator 12, and the coordinator 12 forwards all the schedule IE information to that station 14.

Figure 8:
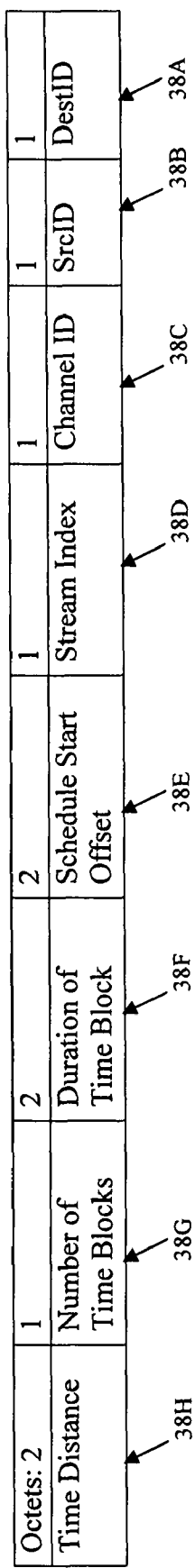
FIG. 8 shows an example format of a schedule item in FIG. 7, according to the present invention.

FIG. 8 shows an example of the formatting of a schedule item 38 for a schedule 30, including the following fields:

38A: DestID indicates a receiver station 14 to which a sender station 14 can send packets.

38B: SrcID indicates the sender station 14 to which channel time is being allocated.

38C: Channel ID indicates the channel in which the bandwidth is being allocated.

38D: Stream Index indicates the stream corresponding to the bandwidth allocation.

38E: Schedule Start Offset indicates the start time of the schedule 30, which is the time offset from the start of the Beacon 22. The resolution of this field is 1 μs, so the valid range is [0-65535] μs.

38F: Duration of Time Block indicates the length of each CTB 32 within the schedule 30. The resolution of this field is 1 μs, so the valid range is [0-65535] μs.

38G: Number of Time Blocks indicates the number of CTBs 32 within the schedule 30 for one superframe 20. The range is [0-255].

38H: Time Distance indicates the duration between two consecutive CTBs 32.

Figure 9:
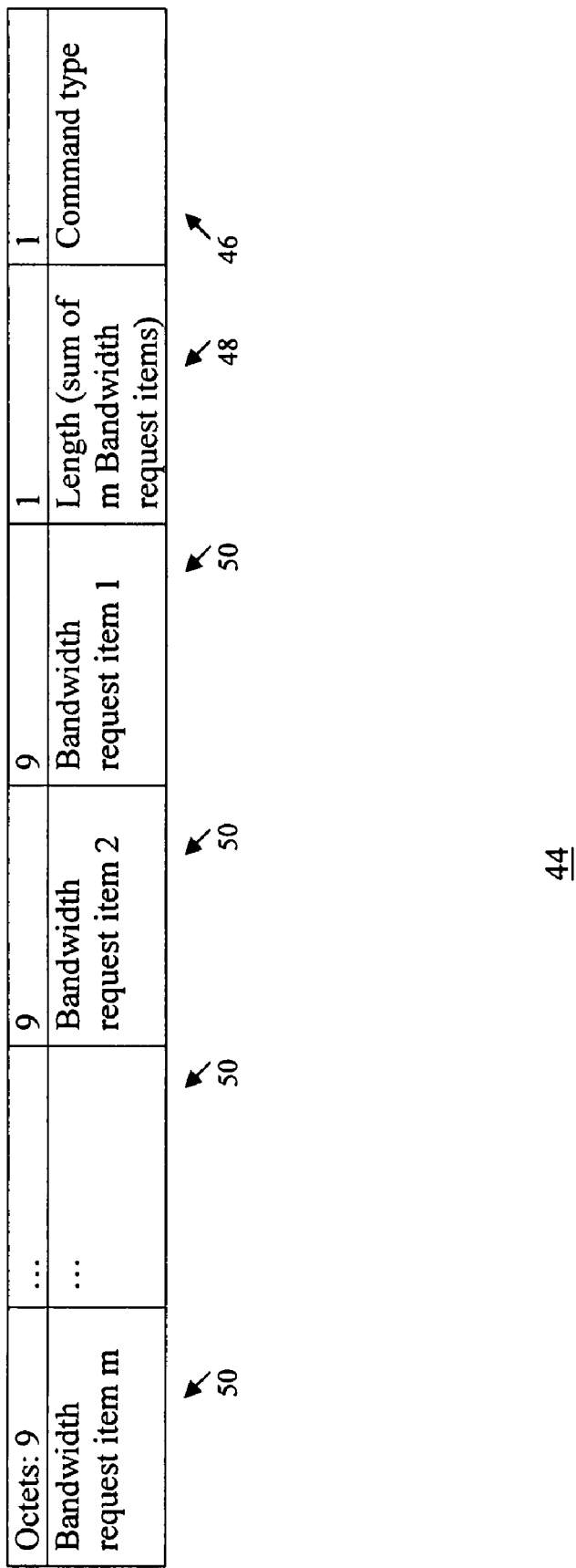
FIG. 9 shows an example bandwidth request command format in the network of FIG. 1, according to the present invention.

FIG. 9 shows an example format for a Bandwidth Request command 44, which is used to request, modify or terminate channel time allocations for both isochronous and asynchronous data traffic. The Bandwidth Request command 44 includes the following fields:

46: Command type indicates the command type of the current Bandwidth Request command (e.g., 0x06 for a Bandwidth Request command).

48: Length indicates the total length of m Bandwidth request items 50. Each Bandwidth request item 50 corresponds to a schedule item 38.

50: A Bandwidth request item.

FIG. 10 show an example format for a Bandwidth request item 52, which includes the following fields:

50A: DestID indicates a receiver station 14 to which a sender station 14 can send packets.

50B: Channel ID indicates the channel in which the bandwidth is being allocated.

50C: Stream Request ID uniquely identifies a request from the receiver station 14 before it receives a stream index from the coordinator 12. If the bandwidth request is for a new isochronous stream, then the Stream Request ID is a non-zero identifier generated by the originating station that is unique among the station's channel bandwidth requests. The Stream Request ID remains constant during the entire packet exchange sequence for establishing a new stream. If the bandwidth request is to modify or terminate an existing stream, or the request is for an asynchronous allocation, then the Stream Request ID is set to zero and is ignored on reception.

50D: Stream Index indicates the stream index assigned by the coordinator 12. In the case where a station 14 is requesting the creation of an isochronous stream, the Stream Index is set to an unassigned stream value by the originating station. In the case where the station is requesting the reservation or termination of an asynchronous channel time, the Stream Index is set to an asynchronous stream value. When the Stream Index is other than the unassigned stream index or asynchronous stream index value, the Bandwidth Request item 50 is a request to modify or terminate an existing schedule 30.

50E: Duration of Time Block indicates the length of each CTB 32 within the schedule 30. The resolution of this field is 1 µs, so the valid range is [0-65535] µs.

50F: Number of Time Blocks indicates the number of CTBs 32 within the schedule 30 for one superframe 20. The range is [0-255].

50G: Minimal Time Distance indicates the minimal allowed duration between two consecutive CTBs 32.

Figure 11:
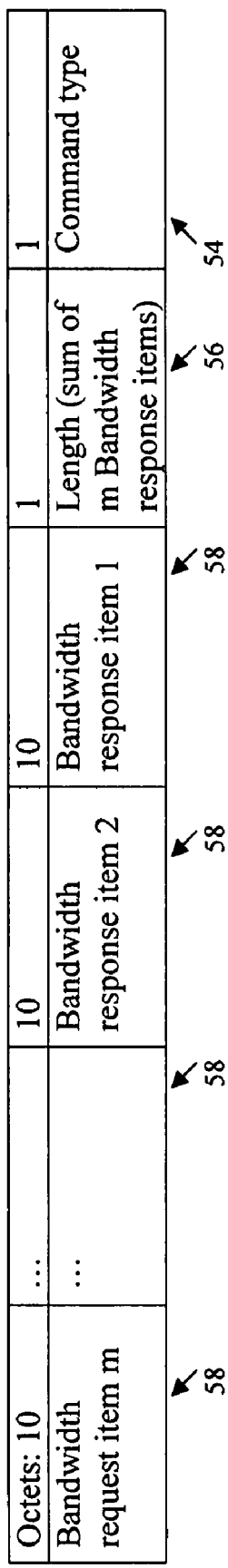
FIG. 11 shows an example bandwidth response command format in the network of FIG. 1, according to the present invention.

FIG. 11 shows an example format for a Bandwidth Response command 52, which is used by the coordinator to respond to Bandwidth Request command 44, modify, or terminate resource allocations for both isochronous and asynchronous data traffic. The Bandwidth Response command 52 includes the following fields:

54: Command type indicates the command type of the current Bandwidth Response command [(e.g., 0x07 for Bandwidth Response command).

56: Length indicates the total length of m Bandwidth response items 58. Each Bandwidth response item 58 corresponds to a schedule item 38.

58: A Bandwidth response item.

Figure 12:
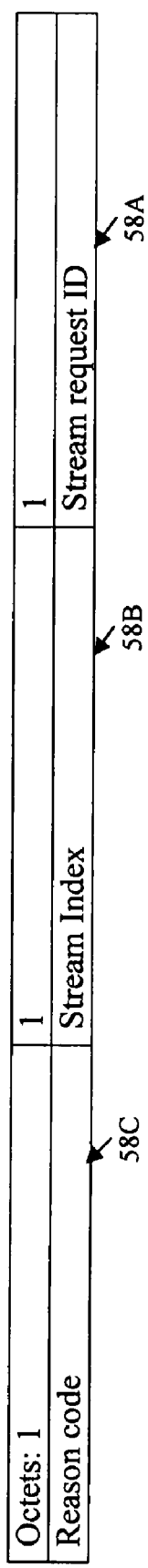
FIG. 12 shows an example format for a bandwidth response item in FIG. 11, according to the present invention.

FIG. 12 shows an example format for the Bandwidth Response item 58, including the following fields:

58A: Stream request ID uniquely identifies a request from the receiver station 14 before it receives a stream index from the coordinator 12.

58B: Stream Index indicates the stream index assigned by the coordinator 12.

58C: Reason code indicates whether the bandwidth request is granted. If not, it indicates the reason. "0" means the bandwidth is successfully allocated.

Figure 13:
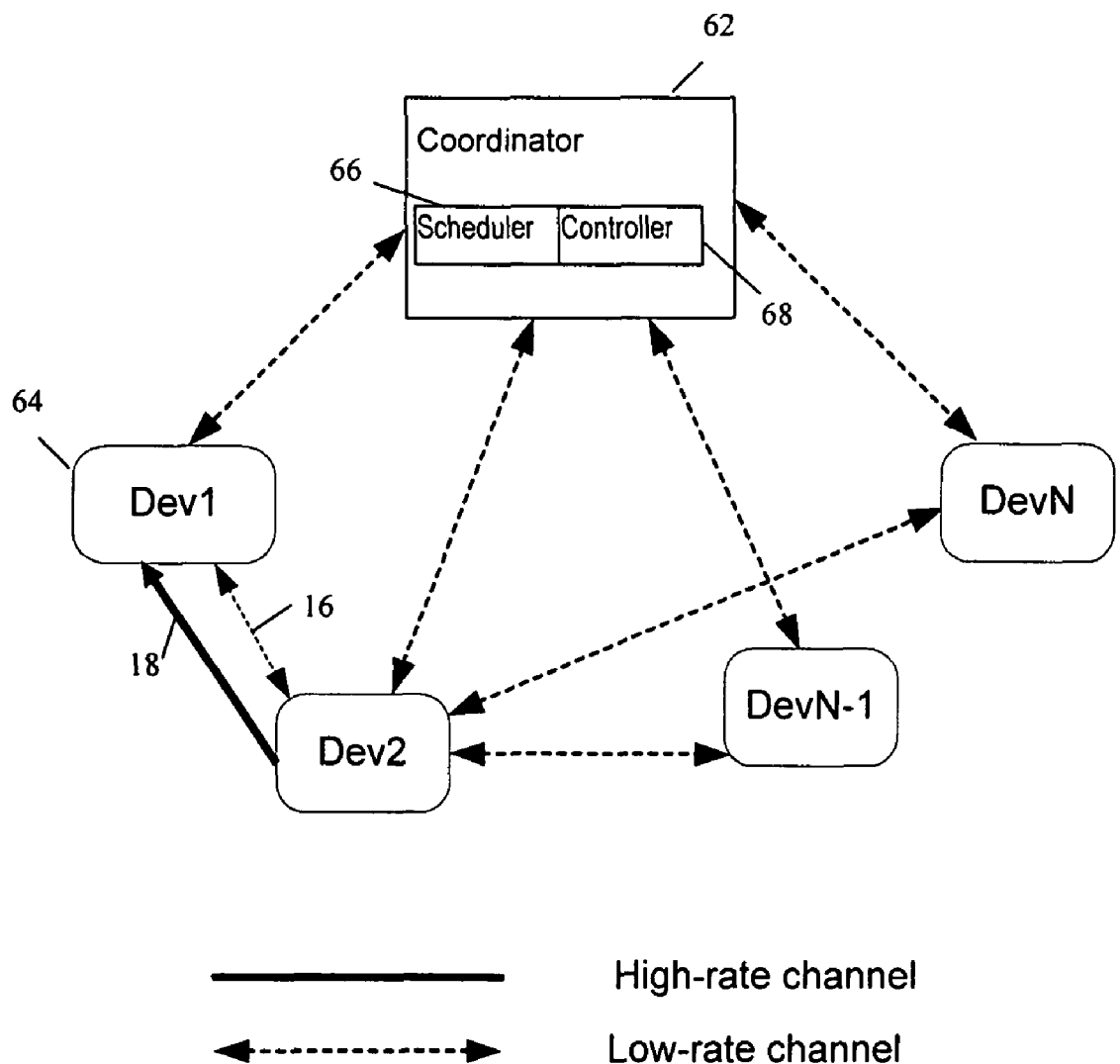
FIG. 13 shows a functional block diagram of another wireless network that implements uncompressed HD video transmission between wireless stations, according to an embodiment of the present invention.

FIG. 13 shows a functional block diagram of another wireless network 60 that implements uncompressed HD video transmission between wireless stations, according to an embodiment of the present invention. The network 60 includes a coordinator 62 and multiple wireless stations 64 (e.g., Dev1, . . . , DevN). The coordinator function for channel access according to the present invention is implemented by the stand-alone coordinator 62. In this example, the coordinator 62 provides channel access control for transfer of video information over the high-rate channel 18 between the Dev2 and Dev1 stations.

The coordinator 62 implements the scheduling and channel access functions described above. The coordinator 62 includes a scheduler 66 configured to divide a contention-free period (CFP) into one or more schedules, wherein each schedule includes one or more periodical CTBs reserved for transmission of isochronous streams, as discussed. The coordinator 62 further includes a controller 68 configured to receive a bandwidth request, and allocate channel bandwidth based on said schedules to control channel access, as discussed.

Figure 14:
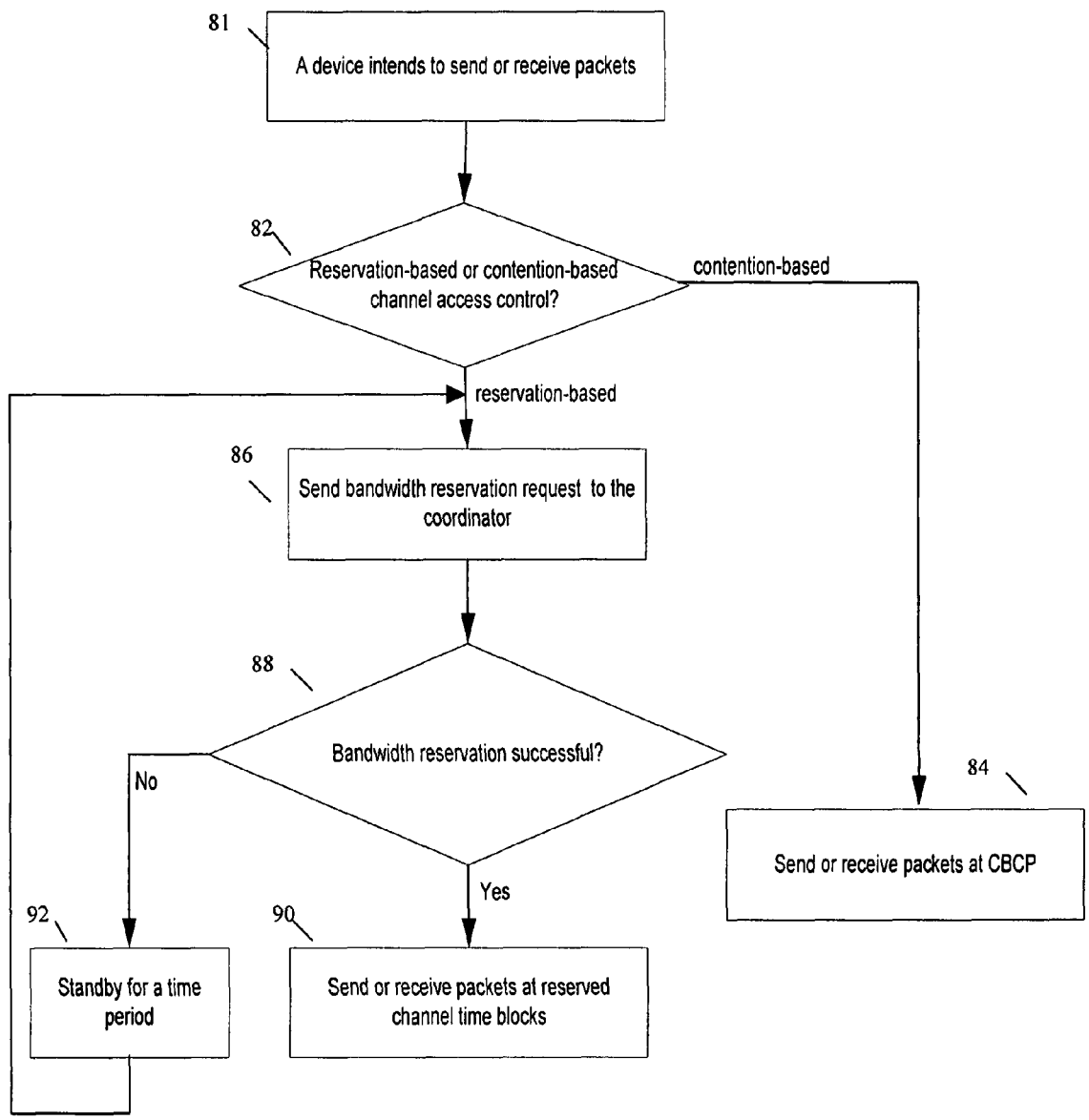
FIG. 14 shows a flowchart of an example process for channel access control implemented in the network of FIG. 13, according to the present invention.

FIG. 14 shows a flowchart of an example process 80 for channel access control implemented in the network of FIG. 13, according to the present invention. When a device intends to send or receive packets over the channel (step 81), the channel access control mechanism is determined (step 82), such that if the device is to utilize contention-based channel access, the device sends/receives packets during the CBCP period (step 84). However, if the device is to utilize reservation-based channel access control, the device sends a bandwidth reservation request to the coordinator to determine if bandwidth can be allocated to the device (step 88). If the coordinator allocates bandwidth to the device by reserving the CTBs for the device, then the device sends/receives packets at the reserved CTBs according to the schedules discussed above (step 90). If the coordinator cannot allocate bandwidth to the device or there the response from the coordinator timeout, then the device stands by for a period of time, and sends another bandwidth allocation request to the coordinator (step 92). Such steps can be implemented in the MAC layer of the coordinator 62 and the devices 64 in the system of FIG. 13.

A channel access control model, according to the present invention, for dividing a CFP into schedules for transmission of video information, meets Quality of Service (QoS) and transmission efficiency requirements for wireless transmission of uncompressed video information. This simplifies the description of channel time block allocation carried in the beacon frames. Further, such an access control method satisfies multiple-dimensional requirements of uncompressed video transmission and multiplexing. This reduces delay jitter, supports in-time retransmission when enough channel bandwidth is available for retransmission, and provides power saving by transmission of multiple packets of a stream in a burst when the receiving buffer size is large enough.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for communication of video information over wireless channels in a communication system including senders and receivers, comprising:

packetizing video information of one or more video streams into packets for transmission over a wireless channel;

controlling channel access by dividing a single contention-free period (CFP) for both a high-rate channel and a low-rate channel into separate multiple schedules, wherein each of the separate multiple schedules within the single CFP includes one or more periodical channel time blocks (CTBs) reserved for transmission of isochronous streams, and the multiple separate schedules are allocated for one isochronous or asynchronous stream; and transmitting packets from a sender to a receiver during the channel time blocks.

2. The method of claim 1 wherein:
transmitting packets further includes: transmitting packets of video information from a sender to a receiver over the high-rate channel during the channel time blocks, and transmitting acknowledgment packets from the receiver to sender over the low-rate channel during the channel time blocks.

3. The method of claim 2 wherein controlling channel access further includes providing a superframe period comprising a beacon frame that provides schedule timing allocations for dividing the contention-free period (CFP) into channel time blocks.

4. The method of claim 3 wherein the superframe further comprises a contention-based control period (CBCP) for communicating control and management commands over a low-rate channel.

5. The method of claim 4 wherein no information is transmitted over a high-rate channel during a CBCP.

6. The method of claim 4 wherein the superframe further comprises a beam-search period (BSP) for searching transmission beams.

7. The method of claim 4 further comprising periodically transmitting a beacon to signal the start of a superframe period.

8. The method of claim 4 wherein the beacon specifies the start time, and length, of the CBCP and CFP in the corresponding superframe.

9. The method of claim 8 wherein the beacon specifies an allocation of channel time blocks to different senders and receivers.

10. The method of claim 9 wherein the beacon further specifies an allocation of channel time blocks to different streams.

11. The method of claim 4 wherein channel access during the CFP is based on Time Division Multiple Access (TDMA).

12. The method of claim 4 wherein each separate schedule comprises a series of evenly distributed CTBs with equal length, in the CFP.

13. The method of claim 4 further comprising:
a sender transmitting a bandwidth request command for transmission of both isochronous streams and asynchronous data over a channel; and
if sufficient bandwidth remains in the channel, then allocating at least one schedule in the CFP to the sender.

14. The method of claim 13 further comprising allocating the separate multiple schedules to the sender.

15. The method of claim 13 further comprising the sender transmitting multiple streams to a receiver over the channel during the at least one allocated schedule.

16. The method of claim 13 further comprising:
the sender transmitting a stream to a receiver over the channel during the at least one allocated schedule; and
the receiver transmitting an ACK to the sender during the at least one schedule.

17. The method of claim 16 wherein during a CTB one or more packets are transmitted from the sender to the receiver, and one or more corresponding ACKs are transmitted from the receiver to the sender.

18. A system for communication of video information over wireless channels, comprising:
a coordinator controls channel access by dividing a single contention-free period (CFP) for both a high-rate channel and a low-rate channel into separate multiple schedules, wherein each of the separate multiple schedules within the single CFP includes one or more periodical channel time blocks (CTBs) reserved for transmission of isochronous stream, and the multiple separate schedules in the single CFP are allocated for one isochronous or asynchronous streams; and
a transmitter including a packetizer that places video information of one or more video streams into packets for transmission over a wireless channel, and a communication module that transmits packets to a receiver over a high-rate channel during the channel time blocks.

19. The system of claim 18 further comprising a receiver that transmits acknowledgment packets from the receiver to the transmitter during the channel time blocks over the low-rate channel.

20. The system of claim 19 wherein the coordinator further provides a superframe period comprising a beacon frame that includes schedule timing allocations for dividing the CFP into channel time blocks.

21. The system of claim 20 wherein the superframe further comprises a CBCP for communicating control and management commands over the low-rate channel.

22. The system of claim 21 wherein no information is transmitted over the high-rate channel during the CBCP.

23. The system of claim 21 wherein the superframe further comprises a BSP for searching transmission beams.

24. The system of claim 21 wherein the coordinator further periodically transmits a beacon to signal the start of a superframe period.

25. The system of claim 21 wherein the beacon specifies the start time, and length, of the CBCP and CFP in the corresponding superframe.

26. The system of claim 25 wherein the beacon specifies an allocation of channel time blocks to different senders and receivers.

27. The system of claim 26 wherein the beacon further specifies an allocation of channel time blocks to different streams.

28. The system of claim 21 wherein channel access during the CFP is based on TDMA.

29. The system of claim 21 wherein each schedule comprises a series of evenly distributed CTBs with equal length, in the CFP.

30. The system of claim 21 wherein:
the transmitter further transmits a bandwidth request command for transmission of both isochronous streams and asynchronous data over a channel; and
the controller further determines if sufficient bandwidth remains in the channel, and if sufficient bandwidth remains in the channel the controller allocates at least one of the separate multiple schedules in the CFP for transmission of both isochronous streams and asynchronous data by the transmitter over the channel.

31. The system of claim 30 wherein the coordinator further allocates the multiple schedules to the transmitter.

32. The system of claim 30 wherein the transmitter further transmits multiple streams to the receiver over the channel during the at least one allocated schedule.

33. The system of claim 30 wherein:
the transmitter further transmits a stream to the receiver over the channel during the at least one allocated schedule; and the receiver further transmits an ACK to the sender during the at least one allocated schedule.

34. The system of claim 33 wherein during a CTB, one or more packets are transmitted from the transmitter to the receiver, and one or more corresponding ACKs are transmitted from the receiver to the transmitter.

35. A coordinator for controlling communication of video information over wireless channels in a communication network, comprising:
a scheduler divides a single contention-free period (CFP) for both a high-rate channel and a low-rate channel into separate multiple schedules, wherein each of the separate multiple schedules within the single CFP includes one or more periodical channel time blocks (CTBs) reserved for transmission of isochronous streams, and the separate multiple schedules are allocated for one isochronous or asynchronous stream; and
a controller receives a bandwidth request, and allocates channel bandwidth based on the separate multiple schedules to control channel access.

36. The coordinator of claim 35 wherein:
the controller receives a bandwidth request over the low-rate channel from a wireless transmitter, and allocates channel bandwidth based on said multiple separate schedules to control access to the high-rate channel by the transmitter for transmission of video information to a wireless receiver over the high-rate channel.

37. The coordinator of claim 36 wherein the scheduler provides a superframe period comprising a beacon frame that includes schedule timing allocations for dividing the CFP into channel time blocks.

38. The coordinator of claim 37 wherein the superframe further comprises a CBCP for communicating control and management commands over the low-rate channel.

39. The coordinator of claim 38 wherein no information is transmitted over the high-rate channel during the CBCP.

40. The coordinator of claim 38 wherein the superframe further comprises a BSP for searching transmission beams.

41. The coordinator of claim 38 wherein the coordinator periodically transmits a beacon to signal the start of a superframe period.

42. The coordinator of claim 38 wherein the beacon specifies the start time, and length, of the CBCP and CFP in the corresponding superframe.

43. The coordinator of claim 42 wherein the beacon specifies an allocation of channel time blocks to different senders and receivers.

44. The coordinator of claim 43 wherein the beacon further specifies an allocation of channel time blocks to different streams.

45. The coordinator of claim 38 wherein channel access during the CFP is based on TDMA.

46. The coordinator of claim 38 wherein each separate schedule comprises a series of evenly distributed CTBs with equal length, in the CFP.

47. The coordinator of claim 38 wherein:
the network includes a transmitter that transmits a bandwidth request to the coordinator for transmission of both isochronous streams and asynchronous data over a channel; and
the controller further determines if sufficient bandwidth remains in the channel, and if sufficient bandwidth remains in the channel then the controller allocates at least one of the separate multiple schedules in the CFP for transmission of both isochronous streams and asynchronous data by the transmitter over the channel.

48. The coordinator of claim 47 wherein the controller allocates the separate multiple schedules to the transmitter.

49. The coordinator of claim 47 wherein the transmitter transmits multiple streams to the receiver over the channel during the at least one allocated schedule.

50. The coordinator of claim 47 wherein the network further includes a receiver, such that the transmitter transmits a stream to the receiver over the channel during the at least one allocated schedule, and the receiver transmits an ACK to the sender during the at least one allocated schedule.

51. The coordinator of claim 50 wherein during a CTB, one or more packets are transmitted from the transmitter to the receiver, and one or more corresponding ACKs are transmitted from the receiver to the transmitter.

52. The method of claim 17, wherein each CTB is limited to including a single data-ACK pair.

53. The method of claim 1, wherein upon a new sender or receiver joining the system, during an association response phase, a coordinator forwards all schedule information to the new sender or receiver.

54. The method of claim 53, wherein upon a sender or receiver enters a sleep mode for a predetermined time period comprising multiple superframes, the sender or receiver wakes and requests schedule information from the coordinator.

55. The method of claim 1, wherein the separate multiple schedules comprise multiple separate data-ACK pairs.

56. The method of claim 1, wherein for each of the separate multiple schedules, only a single data-ACK pair is included within each CTB.

* * * * *